FIG. 5

| A | B | C | D |
|---|---|---|---|
| NEUTRAL | 0 | | 0 |
| 1 ST (LOW) | 0.39 | 1 → 1A | 0.23 |
| 2 ND | 0.62 | 2 → 2A | 0.37 |
| 3 RD | 0.84 | 3 → 3A | 0.50 |
| 4 TH (TOP) | 1.04 | 4 → 4A | 0.62 |

A — CONDITION OF MAIN SPEED-CHANGE MACHINE
B — SPEED-CHANGE RATIO OF MAIN SPEED-CHANGE MACHINE
C — COURSE OF SPEED-CHANGE
D — SPEED-CHANGE RATIO WITH SPEED REDUCTION MACHINE CONNECTED

United States Patent Office 3,435,708
Patented Apr. 1, 1969

3,435,708
SPEED-CHANGE APPARATUS
Soichiro Honda and Yoshinori Okamoto, Tokyo, Japan, assignors to Kabushiki Kaisha Honda Gijutsu Kenkyusho
Filed June 7, 1967, Ser. No. 644,381
Claims priority, application Japan, June 7, 1966, 41/36,266
Int. Cl. F16h 3/16
U.S. Cl. 74—745        8 Claims

ABSTRACT OF THE DISCLOSURE

A mechanical power source including a first section for controlling rotary output speed through a sequence of stages and a speed-reduction device for reducing the speed of the selected stage and a clutch arrangement whereby the speed-reduction device is actuated by operating the first section so that activation of the speed-reduction device is accompanied by a shift from one stage to another.

---

FIGURE 5 is a diagram showing an example of speed-change ratio.

Figure 1:
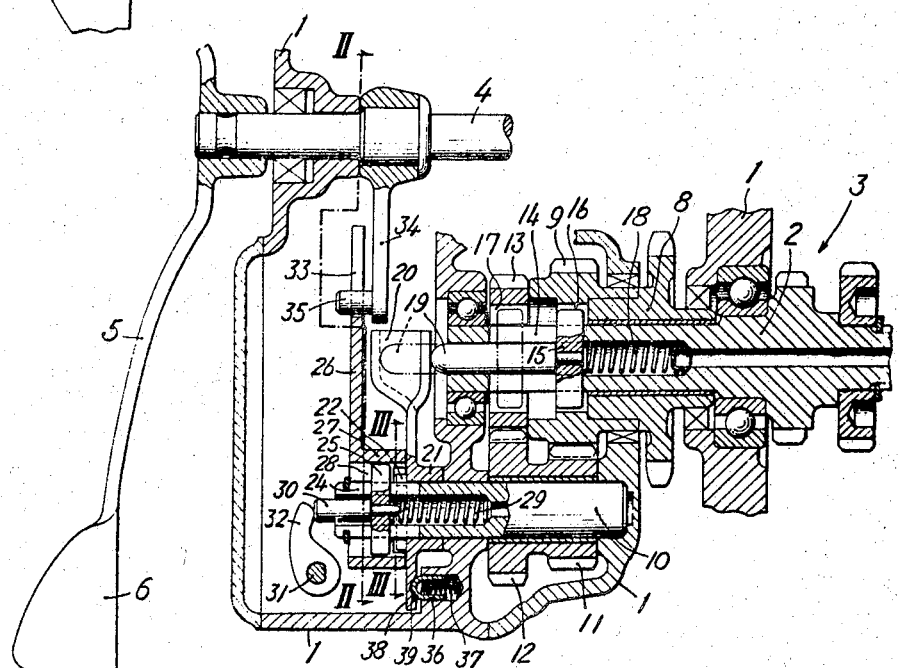
FIGURE 1 is a sectional view of one embodiment of the invention.

A type of speed-change apparatus is known in which a main speed-change device and a speed-reduction device are selectively connected or disconnected for increasing the available number of speed-change stages. In this type of apparatus, the speed-reduction device is so designed that its speed-change ratio is larger than that of each stage of the main speed-change device. Thus, when the speed-reduction device is connected to the main speed-change device, speed reduction is sharply effected and there takes place a strong shock from which results a decreased durability of the mechanism. This tendency is especially pronounced at high speeds.

Furthermore, if this known type of speed-change apparatus is used in a vehicle such as a motor car or the like, marked engine braking results which is of sufficient magnitude as to bring about a dangerous condition for the driver. Accordingly, it is essential for this type of speed-change apparatus that the speed reduction device be connected to the main speed-change device only at a comparatively low speed condition or in a stopped condition. This type of operation, however, is extremely inconvenient.

The present invention has as an object the provision of solutions to such problems and is characterized in that, when the speed-reduction device, the main speed-change device is at the same time stepped up by one stage toward the higher speed side.

The invention will next be explained in greater detail with reference to the accompanying drawing, in which element 3 is a main speed-change device such as a conventional gear transmission having an output shaft 2 and an operation shaft 4 both rotatably supported by a frame 1. An arm 5 mounted on the shaft 4 is provided at its ends with a speed-reducing pedal 6 and a speed-increasing pedal 7.

If the speed-increasing pedal 7 is pushed down repeatedly to cause a reciprocating rotation of the operation shaft 4, the main speed-change device 3 is operated to increase, step-by-step, the speed of the output shaft 2 by several stages in almost the same manner as in a conventional machine of this kind. If, conversely, the speed-reducing pedal 6 is pushed down repeatedly, the output shaft 2 is lowered in speed step-by-step in several stages.

Element 8 is a final output shaft loosely mounted on the output shaft 2, and element 9 is a speed-change gear integrally connected thereto. Element 10 is an intermediate shaft rotatably supported by the machine frame 1.

Two stage gears 11 and 12 formed integrally with one another are loosely mounted on shaft 10. The gear 11 meshes with the speed-change gear 9. At the same time, the other gear 12 meshes with a speed-change gear 13 loosely mounted on the output shaft 2.

An end portion of the output shaft 2 is provided with a longitudinal guide groove 14, and a speed-change rod or key 15 is engaged therewith for slidable movement in longitudinal direction. Engaging openings 16 and 17 alternatively engageable with the rod 15 are made in the inner surfaces of the speed-change gear 9 and 13.

Element 18 is a spring urging the rod 15 outwards, and element 19 is a push rod extending outwards from the rod 15. The external end of rod 19 is in constant contact with an inclined cam plate 20. If the cam plate 20 is rotated in a direction to push the push rod 19 inwards, as shown in solid lines in FIG. 1, the speed-change rod 15 comes into engagement with the opening 16 so that the final output shaft 8 is directly connected with the output shaft 2. If, however, the cam plate 20 is rotated in the reverse direction for allowing the push rod 19 to be projected outwards by the spring 18 as shown in phantom lines, the speed-change rod 15 comes in engagement with the opening 17 so that the rotation of the output shaft 2 is transmitted to the final output shaft 8 through the speed-reduction gear train comprising the gears 13, 12, 11 and 9.

The cam plate 20 is loosely mounted at its bottom end portion 21 on the intermediate shaft 10. The end portion 21 has on its external surface two externally projecting arc-shaped clutch claws 22 surrounding the periphery of the intermediate shaft 10. There are formed between claws 22 spaces 23 which are larger in width than a clutch rod 25 mentioned below.

The intermediate shaft 10 is provided at its end portion with a longitudinal guide groove 24 and the clutch rod 25 is slidably engaged therewith at its middle portion. Additionally, an annular base portion 27 of a connecting rod 26 is loosely mounted on the intermediate shaft 10. The rod 25 is slidably engaged at its ends with a longitudinal groove 28 made in base portion 27.

Element 29 is a spring urging the rod 25 outwards. Element 30 is a push rod extending from the rod 25 and the external end thereof is in contact with an arm 32 mounted on a clutch shaft 31. A longitudinal groove 33 made in the upper portion of connecting rod 26 is in engagement with a pin 35 of an arm 34 secured to the operation shaft 4.

Element 36 is a projection for positioning the cam plate 20 and is mounted in a portion of the machine frame 1 from which it is urged outwards by a spring 36. A projection rim 38 of the cam plate 20 is provided with holes 39 and 40 alternately engageable with said projection 36.

Figure 2:
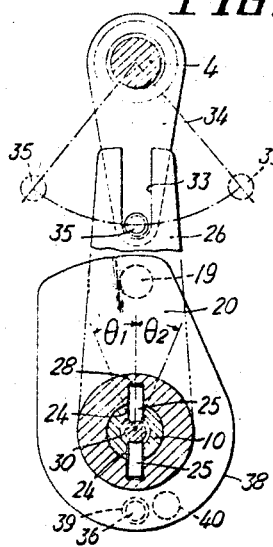
FIGURES 2 and 3 are sectional views taken along lines II—II and III—III in FIG. 1, respectively.
Figure 3:
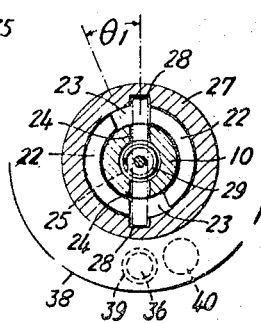
Figure 4:
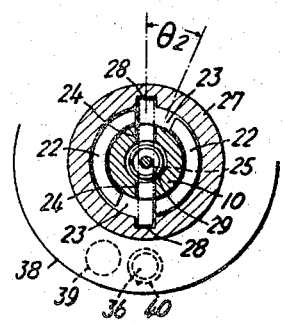
FIGURE 4 is a sectional view showing the operating condition of FIG. 3.

If the speed-reducing pedal 6 is pushed repeatedly to cause reciprocating rotation of the arm 34, the connecting rod 26, the clutch rod 25 and the intermediate shaft 10 are reciprocably rotated within the range of $\theta_1$, as shown in FIGS. 2 and 3. If the speed-increasing pedal 7 is pushed down repeatedly, the connecting rod 26 and associated parts as mentioned above are reciprocably rotated within the range of $\theta_2$ as shown in FIGS. 2 and 4. $\theta_1$ and $\theta_2$ are substantially equal one to another.

The operation next explained is as follows:

FIGS. 1 and 2 show (in solid lines) the condition where the speed-reduction device is disconnected from the main shaft 2 and the main speed-change device 3. In this state, the hole 39 is in engagement with the positioning projection 36 and the cam plate 20 and the clutch claws 22 are inclined slightly by θ1/2 to the left so that the pusher rod 19 is pushed inwards to bring the speed-change rod 15 into engagement with the speed-change gear 9. The clutch rod 25 is separated from the clutch claws 22. Accordingly in this condition, if the output shaft 2 is reduced or increased in speed through the main speed-change device 3 by operation of the pedal 6 or the pedal 7, the final output shaft 8 rotates at the same speed as the output shaft 2.

For connecting the speed-reduction device to the main speed-change device 3, the clutch shaft 31 is first rotated by the actuation of a connected pedal or the like (not shown) so that the clutch rod 25 is pushed inwards by the arm 32 and the push rod 30 to move into the spaces 23 between the clutch claws 22. If, then, the speed-increasing pedal 7 is pushed down, the clutch rod 25 is rotated by θ2 to the right whereby, as shown in FIG. 4, the clutch claws 22 are rotated by the clutch rod 25 to the right. At the same time, the cam plate 20 is also rotated. In connection therewith, the hole 39 is released from engagement with the projection 36 and the hole 40 is brought in engagement with the projection 36. By this rotation the cam plate 20, the speed-change rod 15 is moved outwards and is brought into engagement with the speed-change gear 13. Thereby the speed-reduction device is connected to the main speed-change device 3 and the rotation of the output shaft 2 is transmitted to the final output shaft 8 while being reduced in speed by the speed-change ratio of the speed-reduction device. Since on this occasion, however, the speed-increasing pedal 7 has been pushed down as mentioned before and the main speed-change device 3 has been shifted by one stage to the higher speed side, the final output shaft 8 is not sharply reduced in speed by the speed-change ratio of the speed-reduction machine. Instead, the speed-reducing degree thereof is reduced by the one stage of the speed-change ratio of the main speed-change device.

If the speed-increasing pedal 7 is then relieved of pushing force, the pedal is returned to its original position by a return spring. At the same time the clutch rod 25 is returned to its original position. This return movement of the clutch rod 25 is of a magnitude θ2 within the spaces 23 so that there is no effect on the clutch claws 22. Thus, the clutch claws 22 remain in their rotated positions.

If the connection of the speed-reduction device is completed, the clutch shaft 31 is relieved of its actuating pushing force to return automatically to its initial position under the influence of the spring 29 and the clutch rod 25 is withdrawn from the spaces 23 between the clutch claws 22. If the output shaft 2 is thereafter changed in speed by operation of the main speed-change device through pedals 6 and 7, the speed thereof is transmitted to the final output shaft 8 while being still reduced by the speed-reduction device.

If, under the condition where the speed-reduction device has been connected, the clutch shaft 31 is again actuated and the speed-reducing pedal 6 is pushed down, the clutch claws 22 and the cam plate 20 are returned to their original positions by an operation reverse to that mentioned above, whereby the reduction machine is disconnected from the output shaft 2. At the same time, the main speed-change device is shifted by one stage to the lower speed side. Accordingly, the final output shaft 8 is not sharply reduced in speed by the speed-change ratio of the speed-reduction device and the speed-reducing degree thereof is instead reduced by one stage of the speed-change ratio of the main speed-change device.

FIG. 5 is a diagram showing the speed-change condition as mentioned above, based on a preferred example of speed-change ratio. In this example, the main speed-change device has four speed-change stages and the change ratios at each stage in relation to a driving shaft (a crankshaft) are 0.39, 0.62, 0.84 and 1.04, respectively. The speed-change ratio of the speed-reduction device is 0.6. Accordingly, the speed-change ratio when the speed-reduction device is connected becomes 0.23, 0.37, 0.50 and 0.62. If each stage of the main speed-change machine is denoted, starting from the lower speed side by 1, 2, 3 and 4 respectively as shown in column C of course of speed change at the middle of the diagram and each stage when the speed-reduction device has been connected is denoted 1A, 2A, 3A and 4A respectively, the speed is directly changed, for example, from 3 to 3A when the speed-reduction device is connected to and released from the main speed-change device without using the improvement of the present invention, so that the speed-change ratio is rapidly changed from 0.84 to 0.50. When the present invention is used, however, the speed is not changed from 3 to 3A but is changed to 4A, that is, to one higher stage, so that the speed-change ratio is only changed to 0.62 which is nearer to 0.84.

Thus, according to the present invention, the speed-change ratio when the speed-reduction device and the main speed-change device are connected, can be reduced substantially in comparison with the speed-change ratio of the speed-reduction device, whereby various defects and trouble due to a rapid decrease in speed can be eliminated.

What is claimed is:

1. Apparatus comprising driven means, speed-change means to drive said driven means at speeds controllable through a succession of stages, speed-reduction means selectively insertable between said driven means and speed-change means, and control means to enable the insertion or withdrawal of the speed-reduction means between or from between the driven means and speed-change means while at the same time changing the speed of the latter by one stage, said control means comprising a stage control means for controlling said speed-change means, a speed-reduction control means for the insertion and withdrawal of said speed-reduction means, and connecting means for coupling the stage control means and speed-reduction control means so that the latter is actuated by operation of the stage control means whereby speed-reduction and stage control are concomitantly effected, said speed-change means and driven means including respective rotatable members and said speed-reduction means including a gear train, said speed-reduction control means including engaging means to engage the rotatable members to each other directly or through the intermediary of said gear train.

2. Apparatus as claimed in claim 1, wherein said engaging means includes a rod and a spring acting against said rod and the speed-reduction control means includes a cam acting on said rod against said spring to place the rod selectively in a position to engaging the rotatable members directly together or in a position to engaging the rotatable members together through said gear train.

3. Apparatus as claimed in claim 2, wherein said connecting means includes claws coupled to said cam for controlling movement of the latter, a clutch rod selectively insertable between said claws, a connecting rod to actuate said clutch rod, an arm driven by said stage control means to drive said connecting rod, and a spring normally urging said clutch rod out of engagement with said claws and wherein said speed-reduction control means includes a clutch shaft and arm for pushing said clutch rod against the action of the latter said spring into engagement with said claws.

4. Apparatus as claimed in claim 3 comprising means for yieldably holding said cam and claws in a position established by said clutch rod.

5. Apparatus as claimed in claim 4, wherein the arm driven by said stage control means has actuating and return movements and wherein said claws and clutch rod are engaged with sufficient play to permit return movement of said stage control means without affecting the position of said cam.

6. Apparatus as claimed in claim 5, wherein said stage control means includes a rotatable shaft supporting said arm and diametrally opposed pedals connected to said shaft for rotating the same in opposite directions.

7. Apparatus as claimed in claim 6 comprising a shaft supporting said clutch rod and the spring acting on the clutch rod, said gear train including at least one gear rotatable on the latter said shaft.

8. Apparatus as claimed in claim 7, wherein the stage control means further comprises a gear including an extension on which said driven means is rotatable and provided with a bore accommodating the spring acting against the rod of said engaging means.

References Cited

UNITED STATES PATENTS

| 3,274,856 | 9/1966 | Harrison | 74—745 |
| 3,318,408 | 5/1967 | Hopkins | 74—217 |

FOREIGN PATENTS

| 165,235 | 9/1953 | Australia. |
| 1,147,861 | 5/1957 | Germany. |

DONLEY J. STOCKING, *Primary Examiner.*

THOMAS C. PERRY, *Assistant Examiner.*

U.S. Cl. X.R.

74—371